United States Patent [19]

Icenbice, Jr.

[11] 4,074,230
[45] Feb. 14, 1978

[54] COMMUNICATION METHOD AND APPARATUS FOR PROVIDING AN ENHANCED SIGNAL FROM DIVERSE SIGNALS

[75] Inventor: Phineas J. Icenbice, Jr., Northridge, Calif.

[73] Assignee: Teledyne Industries, Inc., Los Angeles, Calif.

[21] Appl. No.: 689,331

[22] Filed: May 24, 1976

[51] Int. Cl.² .................. G06F 11/08; H04B 7/02
[52] U.S. Cl. .................... 340/146.1 BE; 325/56
[58] Field of Search ........... 340/146.1 BE, 146.1 R; 325/41, 56

[56] References Cited

U.S. PATENT DOCUMENTS

| | | | |
|---|---|---|---|
| 3,444,516 | 5/1969 | Lechleider | 340/146.1 BE |
| 3,526,837 | 9/1970 | Zegers et al. | 340/146.1 BE |
| 3,681,694 | 8/1972 | Sarati | 325/56 |
| 3,781,794 | 12/1973 | Morris | 325/56 |
| 3,829,777 | 8/1974 | Moratani et al. | 325/56 |
| 3,840,855 | 10/1974 | Ameau et al. | 340/146.1 BE |
| 3,864,633 | 2/1975 | Strenglein | 325/56 |
| 3,870,824 | 3/1975 | Baichtal et al. | 340/146.1 BE |
| 3,963,988 | 6/1976 | Niethammer | 325/56 |
| 3,990,009 | 11/1976 | Lentz | 325/41 |

*Primary Examiner*—Charles E. Atkinson
*Attorney, Agent, or Firm*—Blakely, Sokoloff, Taylor & Zafman

[57] ABSTRACT

A communication method and apparatus for providing an enhanced signal from diverse signals whereby high accuracy communication may be established between remote points, even in the presence of severe signal fading and drop outs. The information to be transmitted is provided in digital form and formatted so as to have a Barker code or sync code of adequate length to achieve the desired false alarm rate filtering, followed by the data broken up into data blocks each containing an error detection and correction code for the respective block so that accurate microsecond processing of the signals is possible. The digital signals are modulated and transmitted, ideally with a plurality of frequencies, and are received, preferably at a plurality of remote satellite receiving sites with a plurality of space, path and polarization diversity techniques. The received signals are then processed and a data output signal is constructed from the multiple signals by utilizing the data blocks for which the sync code was properly received and for which the respective error detection and correction code indicates is true data.

15 Claims, 5 Drawing Figures

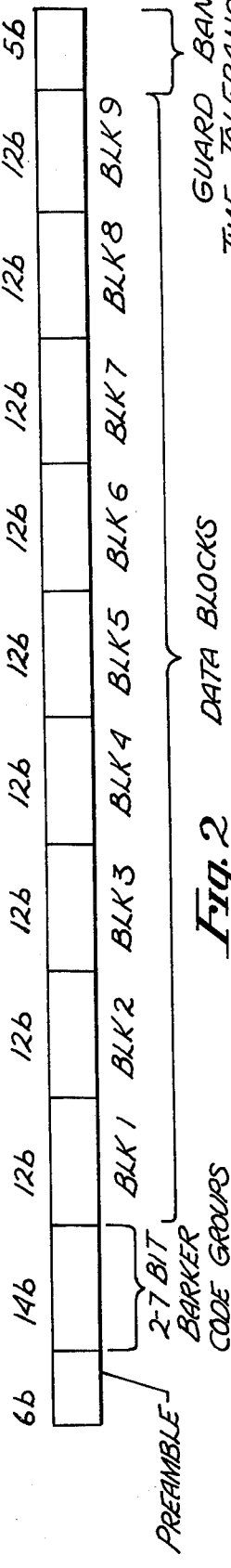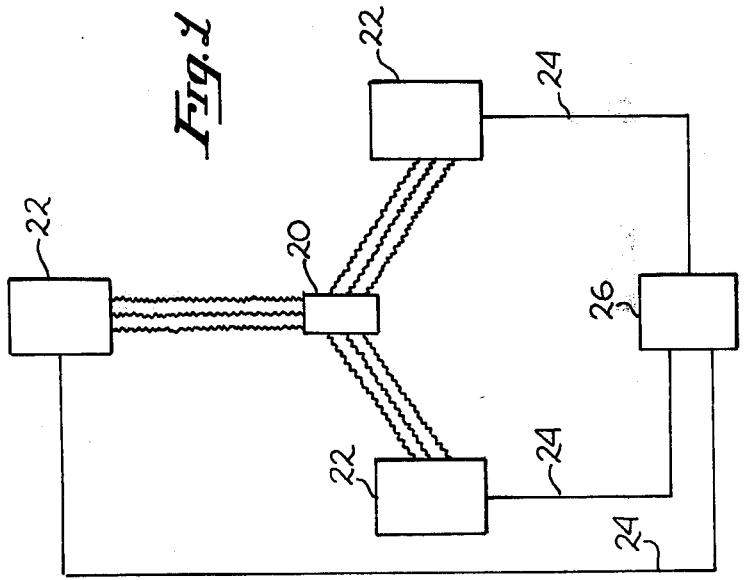

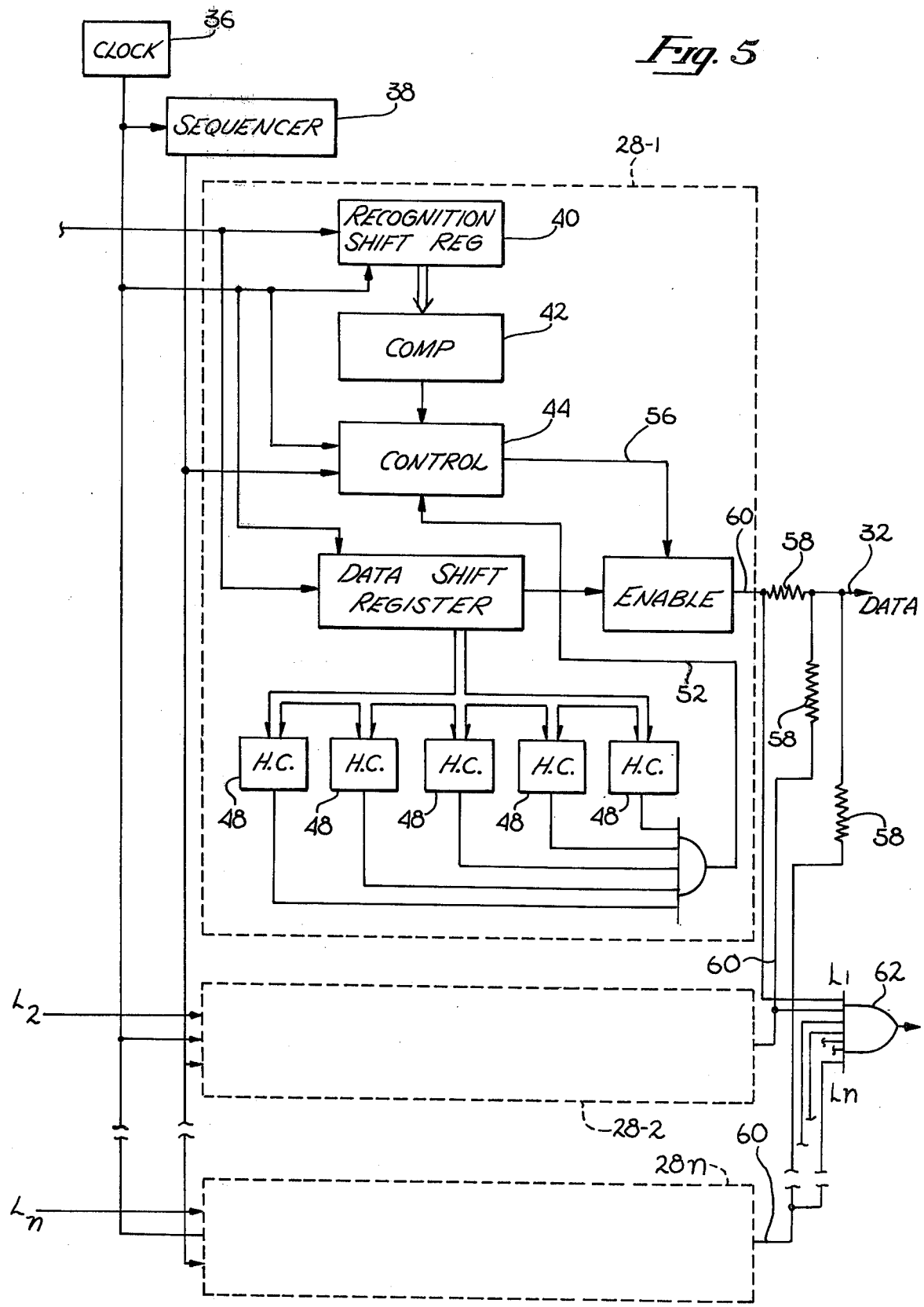

COMMUNICATION METHOD AND APPARATUS FOR PROVIDING AN ENHANCED SIGNAL FROM DIVERSE SIGNALS

BACKGROUND OF THE INVENTION

1. Field of the Invention

The present invention relates to the field of communication systems, and more particularly to communication systems for transmitting and receiving useful information in the presence of varying signal fading and drop outs.

2. Prior Art

Apparatus and techniques for radio communication between two points are well known in the prior art. While such communication is most commonly by way of modulating a voice signal on a carrier, techniques are also well known for modulating digital information in serial form on an appropriate carrier for radio transmission. The most common form of such transmission is a fixed point to point transmission, with the locations of the transmitter and receiver and the transmitter power being selected so as to provide an adequate signal strength at the receiver under substantially all necessary atmospheric conditions.

In certain situations the transmitter or receiver may be mobile (submarine-space-marine-land), such as by way of example, in police cars, public transportation vehicles, emergency vehicles, etc. Accordingly, signal reflections from buildings and the like and atmospheric conditions may temporarily cause the original signal and a reflected signal to arrive at the receiver with substantially the sme amplitude but with opposite phasing, so as to result in serious signal fading and drop out.

There are two approaches which have been commonly used, either alone or together, to minimize the effects of these greatly varying signals. The first is to modulate the information to be transmitted such as the voice signal onto two carriers of differing frequencies and to transmit and receive both signals. Since the two signals have different wave lengths because of their different frequencies, it is unlikely that cancellation of both signals will occur simultaneously, so that the strongest signal or some combination of the two signals will provide a much more reliable signal than either signal individually. The second approach is to provide a plurality of receiving stations physically distributed around the expected area of travel of the transmitting station, again using either the strongest signal received or some combination of signals from all receivers. This space diversity, of course, also enhances the ability to derive a useful signal, as signal drop out at physically diverse locations at the same time is increasingly unlikely.

When using a multiplicity of space diversity, polarization diversity, time diversity and frequency diversity, the likelihood is very high that at least one spatial-temporal signal is of reasonably high quality for one time increment or message block. The problem however is to select each acceptable short message block from the multitude of signals being received and then assemble the short acceptable blocks into the complete message. In the prior art in the case of voice communication, various techniques have been used to attempt to identify the best signal. Rapid and accurate identification of the best signal block is most difficult. In many cases the apparent best signal is manually selected by switching between channels to find one of the demodulated signals which is sufficiently intelligible for the intended communication purposes. However this is rather tedious, particularly under rapidly varying conditions, so that frequently a less than best signal is used until the extent of fade-out is intolerable.

Certain automatic techniques have also been used for selecting the apparent "best" channel which represent a substantial improvement over the manually switched systems. These prior art systems generally depend upon some signal amplitude responsive measurement to either select the best apparent signal or to provide automatic gain control for each of the signals so that the combined signal emphasizes the better signals. However, since noise cannot be eliminated, such systems are typically responsive either to noise or signal plus noise rather than the quality or information content of the signal alone. Examples of systems directed to the problems of this type of communication are the systems disclosed in U.S. Pat. Nos. 2,034,738 (Beverage); 2,642,524 (Bayliss); 2,899,548 (Boughtwood et al); 3,035,169 (Griffith); 3,403,341 (Munch); 3,495,175 (Munch); 3,618,067 (De Vale et al.); 3,718,889 (Rollins).

BRIEF SUMMARY OF THE INVENTION

A communication method and apparatus for providing an enhanced signal from diverse signals whereby high accuracy communication may be established between remote points, even in the presence of severe signal fading and drop outs. The information to be transmitted is provided in digital form and broken up into blocks, each block containing a plurality of data bits and a plurality of error detection and correction code bits. A string of such blocks is preceded by sync code groups, and is modulated for transmission. A plurality of carriers may be employed to provide frequency diversity in the transmission but is not essential if adequate spectrum is not available. (Spectrum spreading will give results similar to space diversity.) Each of these signals in turn are received by each of a plurality of satellite receiving stations, thereby providing space diversity, time diversity, polarization diversity, angle of arrival diversity and path diversity in the system. Each of the received signals may be communicated to a central location for scanning of the various blocks of each signal for which the Barker (sync) code was properly received, and for reconstructing a single serial output data stream representing blocks of data which the error detection and correction code for that block indicates is true data. Thus signal selection among frequency, path, polarization and space diverse signals is achieved based upon the accuracy criteria selected in the message coding check design, rather than on amplitude or pseudo signal to noise measurements of the signals. This system described in this disclosure measures the received message with an established degree of error rate.

BRIEF DESCRIPTION OF THE DRAWINGS

FIG. 1 is a block diagram of a typical automatic vehicle monitoring system utilizing the present invention.

FIG. 2 shows the message format for the preferred embodiment of the present invention.

FIG. 3 illustrates a typical data block for the present invention.

FIG. 4 is a further block diagram of the system of FIG. 1.

FIG. 5 is a schematic diagram of a system for assembling an enhanced signal from diverse signals.

DETAILED DESCRIPTION OF THE INVENTION

The present invention is ideally suited for use in automatic vehicle monitoring systems and/or mobile telephones where the characteristics of the information transmission from the vehicle may be expected to vary tremendously with vehicle position, and accordingly the preferred embodiment of the present invention will be described in detail with respect to such an automatic vehicle monitoring system. Thus, first referring to FIG. 1 a block diagram of a typical system may be seen. In such a system each of the vehicles 20 is provided with a transmitter which transmits the same information signal on a plurality of frequencies (three frequencies in the example illustrated). These signals are in turn received by a plurality of receiving stations 22, in this example three in number, to provide a total of nine received signals. The three signals received from each of the receivers 22 are coupled through lines 24 to some central location 26 for processing and presentation in a manner which will be subsequently described in detail. The lines 24 may be ground lines or microwave lines, or even RF links, as the receivers or satellite stations 22 as well as the central station 26 are fixed in location so that the characteristics of the transmission therebetween should be fairly well known, and the power and antenna limitations of the vehicle 20 do not apply to the satellite stations 22 and the central station 26. Any of the well known modulation-demodulation techniques may be used, though vehicular monitoring in accordance with the preferred embodiment normally will utilize one of the available UHF/VHF/HF frequencies, and use the basic transmission scheme of prior art audio transmission equipment.

The specific type of information being transmitted may vary considerably from application to application but in general may include information such as location, speed, direction, fuel reserve, etc. which for purposes of transmission through the present invention is to be presented in digital form. By way of specific example, information with respect to vehicle location might be manually entered by a bus driver, or a second patrolman in a patrol car, or might be broadcast to the vehicle by limited range transmitters at major street intersections. Other information such as speed and direction may be automatically derived in the vehicle by sensors and digitizers as are known in the prior art. In any event, for purposes of specificity it will be assumed that each message is to be comprised of sixty three bits of data (or less). For purposes of transmission in the preferred embodiment, this sixty three bit data word is broken down and coded for serial transmission as follows: first a six bit preamble is provided, followed by two seven bit Barker code groups which in turn are followed by nine data blocks, each containing seven data bits and five error code detection and correction bits (e.g., a five bit Hamming code) with the last block being followed by a five bit guard band. Thus, each of the transmitted signals before modulation in this embodiment is a serial digital signal as shown in FIG. 2. This signal is then modulated on an appropriate carrier or carriers for transmission at a plurality of frequencies or subcarrier frequencies, three in the specific example given. Various modulation techniques which may be utilized with the present invention are well known in the prior art, though the preferred embodiment utilizes phase modulation techniques for modulating the digital information onto the carriers at a rate of twelve hundred bits per second.

The transmitted signals are received at the satellite stations 22, and are relayed to the central location 26. Thus nine signals are detected at the central station representing the nine combinations of three space diversities and three frequency diversities: (polarization diversity and/or path diversity are equally acceptable alternates or additions to frequency diversity).

These nine signals are demodulated and temporarily held in digital form pending determination of which data blocks have the acceptable message accuracy probability so that the nine data blocks having the selected acceptable probability of accuracy may be assembled to provide a single serial data output message, with or without their full error detection and correction code.

To select the blocks having the highest apparent accuracy for purposes of reassembling a single message of high accuracy the following logical procedure may be followed: (In the following description it shall be presumed that the nine signals representing one full transmission are temporarily retained in registers or memory so as to form nine successive data rows, each having the format of the signal of FIG. 2.) First the fourteen Barker code bits of each line are compared with the predetermined Barker code used. Thereafter, for those lines for which the dual Barker code was transmitted without error, each data block is tested for errors based on its error detection and correction code. In the particular embodiment described single errors are detected and corrected, with double errors only being detected. In general one or more lines will represent signals which suffered severe fading or drop out and which therefore contain little if any true information. For such lines the fourteen bit double Barker code received will not match the true Barker code being used, and accordingly the entire line of information for each line in which the Barker code does not match is eliminated from further consideration because of its higly questionable accuracy. For each line for which the fourteen bit Barker code received does not agree with the code being used, the data blocks will each be considered to represent accurate data, provided the error detection and correction code indicates either that no errors exist, or that one error did exist (and was corrected). Obviously, if any one line is received by way of a strong and clear signal all data in that line may in effect be used directly. Also if single errors occur in data blocks, they may be automatically corrected and the line still used. Should double errors occur, however, it is most likely that at least some other lines will be well received, at least for the Barker code and the respective data block in question, so that the respective data block from that other line may be used. Other design configurations can employ more error correction or less error correction depending upon the trade-off considerations for more or fewer satellite receiving sites and the specified system accuracy. In the preferred embodiment each block of the output signal is assembled from the respective block of the first line for which the dual Barker code matches and for which the respective data block indicated either no error or one error which in turn was automatically corrected.

It is to be understood however, that alternate methods of reconstructing the transmitted signal may be used. By way of example, in the previous description the first of the respective data blocks which is indicated as being accurate by the respective dual Barker code and the individual data block error detection and correction code will be used in reconstructing the message, regardless of whether the respective block of other lines are similarly apparently accurate, or for that matter, if apparently accurate, whether they agree with the data block being used. Obviously other or additional requirements could be imposed upon each data block. By way of specific example, one could require that before any one data block were used in reconstructing the signal, each other equivalent data block of all other lines for which the dual Barker code checks must provide the same data (at least after error correction), or as a further alternative, that the selection be based on a majority rule basis.

Obviously other error avoidance schemes may be utilized in cooperation with the present invention, such as by way of example, limitations on the magnitude of point-to-point jumps. By way of specific example, in an automatic vehicle monitoring system wherein vehicle location is being transmitted, the distance over which a vehicle may travel between successive transmissions is limited and accordingly a single data point too far removed from the immediately previous data point might be chosen to be ignored unless repeated a certain number of times. However it should be noted that the degree of accuracy achieved with the present invention is extremely high and is limited by the number and location of the remote satellite receiving sites, the path, the space and frequency diversity, and the amount of the transmitted information dedicated to sync codes and error detection and correction codes. In the specific embodiment described in detail herein a particular block of data is accepted as valid only if the 14 bit identification code (Barker code) is received with perfect accuracy within the allotted time window, thereby allowing an error rate on the order of one part in two to the 14th or less, and then only if the error detection and correction code for the particular block indicates no errors present in that block or that one error was present and is corrected. This Barker code group precludes random noise activation of the system during quiescent periods.

It was previously stated that a typical data block of twelve bits consisted of seven data bits and five error detection and correction code bits (that is, Hamming code bits). Such a typical data block is illustrated in FIG. 3. The actual Hamming code used in the preferred embodiment uses the parity bit P1 as the parity bit for the seven data bits, and the fifth parity bit P5 as the parity bit for all preceding bits, that is, data bits B1–B7 and parity bits P1–P4. The parity bit P2 is used as a parity check for data bits B2, B3, B6 and B7, and parity bit P4 is used for the parity check of data bits B4, B5, B6 and B7. Negative parity is used. This assignment of parity bits is summarized in the following table:

| Parity Checks | Hamming Code Generation | | | | | | | | | | | |
|---|---|---|---|---|---|---|---|---|---|---|---|---|
| | Information Code | | | | | | | | Additional Check Bits | | | |
| | $B^1$ | $B^2$ | $B^3$ | $B^4$ | $B^5$ | $B^6$ | $B^7$ | $P^1$ | $P^2$ | $P^3$ | $P^4$ | $P^5$ |
| $P^1$ | X | X | X | X | X | X | X | X | | | | |
| $P^2$ | X | | X | | X | X | X | | X | | | |
| $P^3$ | | X | X | | | X | X | | | X | | |
| $P^4$ | | | | X | X | X | X | | | | X | |
| $P^5$ | X | X | X | X | X | X | X | X | X | X | X | X |

With this assignment of parity bits, the following table identifies the single bit error based upon the parity checks not met. (Double errors in each block are indicated by the fact that parity check P5 is met but one or more of the other parity checks are not met.)

| Bit In Error | Erroneous Bit Identification | | | | |
|---|---|---|---|---|---|
| | $P^1$ | $P^2$ | $P^3$ | $P^4$ | $P^5$ |
| $B^1$ | X | X | | | X |
| $B^2$ | X | | X | | X |
| $B^3$ | X | X | X | | X |
| $B^4$ | X | | | X | X |
| $B^5$ | X | X | | X | X |
| $B^6$ | X | | X | X | X |
| $B^7$ | X | X | X | X | X |
| $P^1$ | X | | | | X |
| $P^2$ | | X | | | X |
| $P^3$ | | | X | | X |
| $P^4$ | | | | X | X |
| $P^5$ | | | | | X |

In many applications of the present invention the clocks in the transmitters and receivers will not be perfectly sycnhronized. Accordingly, the exact time in which a signal is expected at a receiver will not be known and the time window may vary somewhat; in the preferred embodiment described herein being plus or minus five bits maximum. Thus, in the interrogation of the received signal the Barker code comparison must be done over a corresponding bit span, with an effective shift left or shift right of the subsequent bits based on the outcome of this comparison prior to checking the individual data blocks based on the Hamming codes. (Though the clocks of the various transmitters may drift one to another, all nine signals from a given transmitter should have substantially identical timing for a bit rate of 1200 bits per second, so that the exact time window for the Barker codes, though not known ahead of time, should be the same for all nine signals.)

In the preferred embodiment the recognition and alignment of the Barker codes as well as the error detection and correction are accomplished through the use of a microprocessor having a program loaded in read only memory to carry out the detailed steps of the logical data reduction hereinbefore defined. Thus a complete system in accordance with the present invention may be seen in FIG. 4 and consists of the transmitter 20 transmitting to a plurality of remote satellite receiving sites 22 which relay the signals to the central station 26 which contains apparatus 28 to receive the nine signals and, for the allotted time window of each message, identify and recognize the dual Barker code and assemble a single highly accurate message from a combination of data blocks in those signals wherein the Barker codes are properly received. Commercially available microprocessor computational rates are adequate to carry out the required data reduction and reassembling of a message so that the output of the reconstructed message on line 32 may also be provided at an equivalent 1200 bit per second rate, though delayed slightly in time (on the order of one to two message time lengths), a factor which may readily be compensated for in the utilization means 34. Also of course, depending upon the nature of the utilization means 34, it may be desirable to reformat the message, dropping the parity bits above P1, reformating into blocks of eight data bits plus one parity bit, etc. for storage or graphic display. Accordingly the processor 28 may be comprised of a commercially available microprocessor, suitably interfaced, timed and programmed (preferably with a read only memory) to do the required comparisons and assemble the desired information.

One form of practicing the present invention has been described with reference to the use of a microprocessor, and a data rate of 1200 bits per second has been identified by the way of the example. However, it is to be understood that the data rates, the manner of modulation and demodulation and the means used for data reduction may vary substantially, based upon varying conditions and design choices. By way of example, interrogation for recognition of the dual Barker codes could be accomplished at the remote satellite receiving sites. Similarly, the Barker code recognition and the parity checking may readily be accomplished by hard wired logic, using nine serial in, parallel out shift registers and appropriate gating. Further, the extent of space diversity and/or frequency diversity utilized may be varied, depending upon the requirements of a particular application. While the present invention method contemplates the interrogation of a plurality of signals, such signals might represent a single diversity rather than the dual diversity hereinbefore described. The important feature of the present invention is the fact that the received signals are utilized not based upon their intensity or even their apparent signal over noise characteristics, but instead upon their precise mathematical probability of exceeding a selected minimum criteria of likelihood of exceeding a selected accuracy based upon the information content of the signal itself.

To illustrate the foregoing mathematically, consider the embodiment using a dual seven bit Barker code followed by nine data blocks, each having seven data bits and five parity check bits.

The immunity to capture of the message preamble and synchronization employing a 7 Bit Barker Code period with 7 Bits repeated = 14 Bits or $2^{14}$ = 16,384 db rejection = $10 \log_{10}(16,384)$ or 42.14 db

The immunity to capture by noise and interference for each incremental message block is $2^5$ = 32 db rejection = $10 \log_{10}(32)$ or 15.05 db

The double Barker Code (14 Bits) and first 12 Bit message block rejection ratio to noise or random trials required for spoofing is: $2^{14} \times 2^5 = 5.2 \times 10^5$ or expressed in db 15.05 db Incremental message block + 42.14 db Preamble Barker sync. code 57.19 db Total rejection For a binary symmetric channel the proability of correct decoding for group codes is given by:

$$P \text{ (correct decoding)} = \gamma_0 P_c^N + \gamma_1 (1-P_c) P_c^{N-1} + \gamma_2 (1-P_c)^2 P c^{N-2} \quad \text{(Eq.1)}$$

(This is a standard result and may be found on page 163 of Information Coding Theory, F.M. Ingels, Intext, 1971.)

The following notational conventions and assumptions are employed:

$P_c = 1-10^{-6}$ = Probability of receiving a given bit correctly with S/N ratio of 14 db + 6 db margin.
$\gamma_0, \gamma_1, \gamma_2$ = Coset Leaders
$N = 12$ = Total Block Length
$K = 7$ = Number of message bits
$B = 5$ = Number of parity check bits For a block length of 12 bits with 7 message bits and 5 check bits, $\gamma_0 = 1$, $\gamma_1 = 12$, $\gamma_2 = 19$. Substituting these values into equation (1) shows that the probability of correctly decoding a 12 bit block is:

$$P_{cdb} = 9.99999999886 \times 10^{-1}$$

so that the probability of incorrectly decoding the block is:

$$P_{IDB} = 9.14 \times 10^{-10}$$

Since there are nine blocks in the total 124 bit message, the probability that the total message is incorrectly decoded is:

$$P_{IDM} = 1.03 \times 10^{-9}$$

Whether a microprocessor programmed by READ-/ONLY memory or a hard wired logic system is used for the apparatus 28 of FIG. 4, the operation of such apparatus may be best described with reference to FIG. 5, which provides a block diagram for a specific suitable circuit. In this particular circuit the inputs are provided on lines L1 through LN, or in the embodiments of FIG. 4, L1 through L9, as nine demodulated signals are provided as a result of the nine combinations of diversity. Each of the received signals are coupled to circuits identified by the numbers 28-1 through 28-N, which in turn are controlled in part by the master clock or oscillator 36 and a sequencer 38, the function of which is about to be described.

Each of the circuits 28-1 through 28-N may be identical, and accordingly only one of such circuits shall be described in detail. The signal on line L1 is coupled to the input of a shift register 40, being clocked by clock 36 at the predetermined data rate (1200 bits per second by way of example), so that each bit is clocked through the recognition shift register 40, whether comprising the preamble, the Barker code groups, data blocks or the guard band time tolerance. The comparator 42 provides a bit for bit comparison between the plurality of bits in shift register 40 with the predetermined Barker code groups (either a 14 bit comparison for the code illustrated in FIG. 2, or two sequential seven bit comparisons) and provides a signal out to the control circuit 44 indicating the recognition of the Barker codes. Also, the sequencer 38, being referenced to the clock 36, identifies the time window to the control 44 during which the Barker codes may be received, so that the control 44 is responsive only to the output of the comparator 42 during the allotted time window.

The input line Ll is also coupled directly to a data shift register 46 which is continually clocked by clock 36 to shift and store the input signal, whether comprising data, Barker codes, etc. The information in the shift register 46 is checked for parity for the full five bit Hamming code by parity checkers 48, with AND gate 50 providing a signal on line 52 to the control 44 upon the satisfaction of all five parity checks. (The parity check devices 48, by way of example, may each be part number SN74180 as manufactured by Texas Instruments, or Part No. MC8504P/MC8506P manufactured by Motorola or other similar equivalents). At an appropriate time, after recognition of the Barker codes during the allotted time window and further after the parity checks indicate true data in the data shift register 46, gate 54 is enabled, allowing the data to be shifted out of the data shift register 46 onto the output line 32.

The timing for the various circuits is provided in part by the sequencer 38 and in part by the control 44, both being referenced to the master clock 36. In particular, the sequencer 38 identifies the time window during which the control 44 will be responsive to an output from comparator 42 indicating the recognition of the recognition code. The control then steps through a predetermined number of clock pulses or bits (12 bits for the data format shown in FIG. 2 to represent one block of information) at which time and only at which time will the control be responsive to the parity check signal on line 52. If the parity check signal represents an unfavorable parity check, the control merely counts through 12 more clock pulses or bits, thereby loading the second block of information into the data shift register 46, and again checks the overall parity signal on line 52. If the parity check signal on line 52 is favorable at the appropriate time, a signal is provided on line 56 to the enable gate 54. This may be done immediately so that the full data block including the five bit Hamming code is clocked out onto line 32. As one alternative, an enable gate 54 might be enabled four clock pulses after the favorable parity check so that four of the five Hamming code bits are dropped, leaving only the overall parity bit, or as a further alternative, five clock pulses after the favorable parity check so that all parity bits are dropped. In any event, after 12 clock pulses following the favorable parity check, the control 44 disables gate 54 and responds to the parity check signal on line 52 representing the Hamming code check of the next data block. This sequence is continued, for the data format shown in FIG. 2 nine times, with the control 44 then disabling itself awaiting the next concurrence of a comparison check by comparator 42 during the appropriate time window provided by sequencer 38.

Thus it may be seen in the foregoing description that sequencer 38 is merely a form of counter, periodically identifying a time window to the individual circuits 28-1 through 28-N, and that control 44 is similarly a counter synchronous with clock 36 and referenced to the concurrence of the comparator and sequencer signals, and effectively disabled or reset by an unfavorable parity check on line 52.

Also it will be noted in FIG. 5 that all output signals for the various circuits 28-1 through 28-N are merely coupled to line 32. This is possible since only circuits sensing "true data" are coupling signals on the line 32 at any one time, and accordingly all signals coupled to the line should be identical. In that regard resistors 58 are not required for any signals having up to two errors in any data block. However the resistors 58 provide certain additional capabilities with respect to an occasional occurrence of three or more undetected errors in a data block. In particular it should be noted that the enable gate 54 must generally be characterized by an open or floating output line when not enabled so as to allow the output of one or more of the other circuits to drive line 32 as required. Thus the state of line 32 is generally determined by the majority state of the outputs for those circuits L1 through LN which are enabled for the particular data block.

To illustrate the effect of the foregoing in any particular instance, the signals on the various lines L1 through LN may have grossly varying character. By way of of example, in the case of nine lines, a couple of lines may have one or more errors in the recognition code so that the entire line of information for that word is neglected. Also for any data block, a couple of lines may have one or two errors, and accordingly the corresponding block for these two lines will also be neglected. Of the five remaining lines, the corresponding data block of one of the lines may possibly have three or more errors which may go undetected in the corresponding Hamming code check. The net result is that the outputs on lines 60 for four of the five circuits will be driven to the proper state, and the output on the fifth line 60 will be driven to the incorrect state, though the resistors 58 will average these five signals to still effectively drive line 32 to the proper state. Thus resistors 58 have a tendency to provide majority logic at the output to reject a minority occurrence of undetected errors. (If desired, a true majority logic could be coupled to each of the circuits 28-1 through 28-N to provide the output on line 32 so that the state of the output on line 32 was positively established, even in the event of say a five-four split of the nine inputs.) Further, a gate 62 may be used to provide an output indicative of a successful check of all blocks. (It is to be noted that in this embodiment single errors are detected but not corrected though the code would allow correction if additional logic were provided.)

While different forms of coding would well be utilized with the present invention, the total number of sync and error detection and correction bits is minimized by having a significant number of bits devoted to the sync or recognition code, which upon recognition establishes a relatively high degree of confidence in the remaining message data, followed by a further assignment of error detection and correction code bits to the data, preferably in blocks, so that single errors may be detected and corrected and double errors detected to further minimize the possibility of false data getting through. Also, depending upon the application, the optimum data rate and the abruptness of fading and drop out may vary, thereby allowing a longer message after the sync code, or dictating that a shorter message be used. Thus while the preferred embodiments of the present invention have been disclosed and described in detail herein, it will be understood by those skilled in the art that various changes in form and detail may be made therein without departing from the spirit and scope of the invention.

I claim:
1. A method of communicating comprising the steps of:
   (a) providing a digital signal to be communicated;
   (b) formating the digital signal into a serial digital signal having a plurality of information bits, the digital signal being preceded by a predetermined recognition code, and containing an error detection code, the error detection code having a number of bits which is less than the number of information bits;
   (c) modulating and transmitting the digital signal;
   (d) receiving and demodulating a plurality of diverse signals each representing the transmitted signal, to provide a plurality of received digital signals;
   (e) interrogating the plurality of received digital signals for recognition of the predetermined recognition code;
   (f) interrogating the plurality of received information bits in the digital signals in conjunction with their error detection code; and
   (g) assembling a digital signal by selecting at least one received digital signal for which the recognition code was in fact recognized and which the respective error detection code indicates is accurate.

2. The method of claim 1 wherein step (b) comprises the step of formating the digital signal into a serial digital signal preceded by a predetermined recognition code, and containing a plurality of data blocks, each containing a plurality of information bits and an error detection code; and step (g) comprises the step of assembling a digital signal by selecting data blocks from the received digital signals for which the recognition code was in fact recognized and for which the respective data block was indicated as true by the associated error detection code.

3. The method of claim 2 wherein the error detection code comprises a Hamming code for single error detection and correction and double error detection.

4. The method of claim 3 wherein single errors detected in step (f) of claim 1 are corrected.

5. The method of claim 1 wherein step (c) comprises the step of modulating and transmitting the digital signal on at least two carrier frequencies.

6. The method of claim 1 wherein step (d) comprises the step of receiving the signals at a plurality of remote receiving stations.

7. The method of claim 1 wherein the diverse signals received are signals having a plurality of diversities.

8. A method of communicating comprising the steps of:
(a) providing a digital signal to be communicated;
(b) formating the digital signal into a serial digital signal having a plurality of data blocks preceded by a predetermined recognition code, each of the data blocks having a plurality of information bits and an error detection code, the error detection code having a number of bits which is less than the number of information bits;
(c) modulating and transmitting the formated digital signal at a plurality of frequencies;
(d) receiving the frequency diverse signals at a plurality of remote satellite receiving stations;
(e) demodulating each of the frequency diverse signals received at each of the plurality of remote satellite receiving stations to provide a plurality of received digital signals;
(f) interrogating the plurality of received digital signals for recognition of the predetermined recognition code;
(g) interrogating at least some of the data blocks of the plurality of received digital signals in conjunction with their error detection code; and
(h) assembling a digital signal by selecting data blocks from the received digital signals for which the recognition code was in fact recognized and for which the respective data block was indicated as being accurate by the associated error detection code.

9. The method of claim 8 wherein the error detection code comprises a Hamming code for single error detection and correction and for double error detection.

10. The method of claim 9 wherein single errors detected in data blocks of the received digital signals are corrected.

11. Communication apparatus comprising:
transmitting means for transmitting a signal containing digital information having a recognition code and at least one data block having a plurality of information bits and a lesser plurality of error detection code bits;
receiving means for receiving diverse signals each representing said transmitted signal;
comparing means coupled to said receiving means for comparing said recognition code of said received signals with a predetermined recognition code;
interrogating means coupled to said receiving means for interrogating data blocks in light of their error detection code; and
means coupled to said comparing means and said interrogating means for providing an output representing a data block from at least one of said diverse signals for which the recognition code was recognized and for which the respective error detection code failed to indicate an error.

12. The apparatus of claim 11 wherein said transmitting means comprises means for transmitting a recognition code and a plurality of data blocks associated therewith, said interrogating means is a means for interrogating successive data blocks, each in light of its error detection code, and said means for providing an output is a means for providing an output comprised of successive data blocks, each data block representing a data block from at least one of said diverse signals for which the recognition code was recognized and for which the respective error detection code failed to indicate an error.

13. The apparatus of claim 11 wherein said receiving means comprises a plurality of means for receiving diverse signals, each spaced from the others and being distributed about an area.

14. The apparatus of claim 11 wherein said transmitting means comprises a means for transmitting a signal at a plurality of frequencies, each representing said signal, and said means for receiving diverse signals comprises means for receiving signals at said plurality of frequencies.

15. The apparatus of claim 14 wherein said means for receiving diverse signals comprises a plurality of means for receiving diverse signals, each spaced from the others and being distributed about an area.

* * * * *

UNITED STATES PATENT OFFICE
CERTIFICATE OF CORRECTION

Patent No. 4,074,230                    Dated February 14, 1978

Inventor(s) Phineas J. Icenbice, Jr.

It is certified that error appears in the above-identified patent and that said Letters Patent are hereby corrected as shown below:

Column 2, line 22, "3,718,889" should read -- 3,718,899 --.

*Signed and Sealed this*

*Twenty-first* Day of *November 1978*

[SEAL]

Attest:

RUTH C. MASON
*Attesting Officer*

DONALD W. BANNER
*Commissioner of Patents and Trademarks*